United States Patent
Radermacher

(10) Patent No.: US 9,253,831 B2
(45) Date of Patent: Feb. 2, 2016

(54) DRIVER DEVICE AND DRIVING METHOD FOR DRIVING A LOAD, IN PARTICULAR AN LED UNIT

(71) Applicant: KONINKLIJKE PHILIPS N.V., Eindhoven (NL)

(72) Inventor: Harald Josef Günther Radermacher, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/356,184

(22) PCT Filed: Oct. 29, 2012

(86) PCT No.: PCT/IB2012/055971
§ 371 (c)(1),
(2) Date: May 5, 2014

(87) PCT Pub. No.: WO2013/064960
PCT Pub. Date: May 10, 2013

(65) Prior Publication Data
US 2014/0312795 A1   Oct. 23, 2014

(51) Int. Cl.
*H05B 33/08* (2006.01)
(52) U.S. Cl.
CPC .................................. *H05B 33/0809* (2013.01)
(58) Field of Classification Search
CPC ........... H05B 33/0815; H05B 33/0809; H05B 41/36; H02H 5/105; H05H 3/335
See application file for complete search history.

(56) References Cited

U.S. PATENT DOCUMENTS

| 2009/0315477 A1 | 12/2009 | Kinsella |
| 2010/0090604 A1 | 4/2010 | Maruyama et al. |
| 2011/0140622 A1 * | 6/2011 | Suzuki .......................... 315/224 |

FOREIGN PATENT DOCUMENTS

| WO | 2009121956 A1 | 10/2009 |
| WO | 2011013060 A2 | 2/2011 |
| WO | 2011050453 A1 | 5/2011 |
| WO | 2011100257 A1 | 8/2011 |
| WO | 2011114261 A1 | 9/2011 |

* cited by examiner

*Primary Examiner* — Douglas W Owens
*Assistant Examiner* — Raymond R Chai
(74) *Attorney, Agent, or Firm* — Yuliya R. Mathis

(57) ABSTRACT

A driver device for driving a load, in particular an LED unit having one or more LEDs. The driver device includes input terminals for receiving an input voltage from an external power source and a polarity-dependent unit for connecting the input terminals to each other and for providing a current path dependent on the polarity of the input voltage. The polarity-dependent unit includes a first current path for connecting the input terminals in a first current direction and a second current path for connecting the input terminals in a second current direction opposite to the first current direction. The first and the second current path each comprise a current control unit for controlling a bleeding current in the respective current path and diodes for blocking the bleeding current in the respective current path in a reverse direction opposite to the respective current direction.

15 Claims, 9 Drawing Sheets

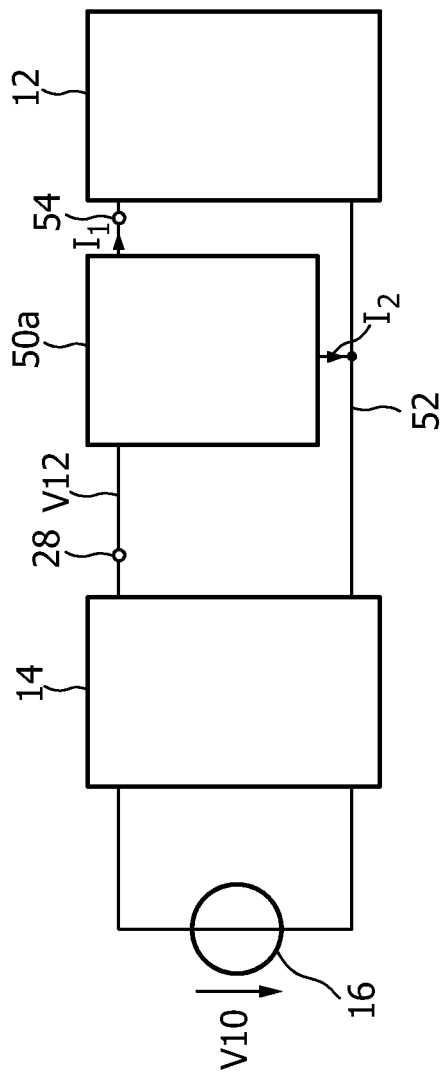
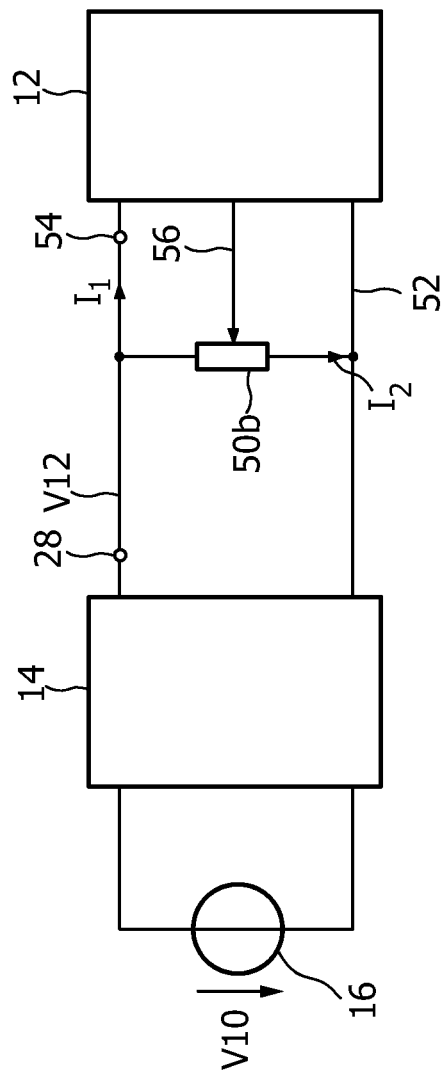

DRIVER DEVICE AND DRIVING METHOD FOR DRIVING A LOAD, IN PARTICULAR AN LED UNIT

FIELD OF THE INVENTION

The present invention relates to a driver device and a corresponding driving method for driving a load, in particular an LED unit comprising one or more LEDs. Further, the present invention relates to a light apparatus.

BACKGROUND OF THE INVENTION

In the field of LED drivers for offline applications such as retrofit lamps, solutions are demanded to cope with high efficiency, high power density, long lifetime, high power factor and low cost, among other relevant features. While practically all existing solutions compromise one or the other requirement, it is essential that the proposed driver circuits properly condition the form of the mains energy into the form required by the LEDs while maintaining compliance with present and future power mains regulations. In addition, it is required that the driver circuits comply with existing power adjusting means, e.g. dimmers or the like, so that the drivers can be used universally as a retrofit driver device including the LED units.

The driver circuits should comply with all kinds of dimmers and especially the drivers should comply with phase-cut dimmers, which are preferably used to regulate the mains power with low power loss. The dimmers which are generally used to regulate the mains energy provided to a filament lamp need a low load impedance path for a timing circuit operation current to adjust the phase-cut timing. Alternatively, when this path is provided continuously, making and breaking that path for certain parts of the mains voltage cycle can also result in stable operation. The provision of this low impedance path has to be adjusted with respect to the zero crossing of the mains voltage. To achieve timely provision of this low impedance path, the zero crossing is usually detected by the driver circuit of the lamps while it is in a high impedance state. Such a zero-crossing detection is complicated and involves a high technical effort, and if a large number of LED units are connected to one dimmer circuit, the technical effort increases due to the required increase of the impedance of each individual LED unit.

WO 2009/121956 A1 discloses a lighting apparatus comprising an LED assembly and a rectifier unit to connect the LED unit to a dimmer circuit. The LED unit comprises a bleeder connected in parallel to the LED unit to provide a bleeding current. The bleeder unit is controlled by a control unit connected to the LEDs to provide the bleeding current at certain point in time of the rectifier AC voltage. This control unit is complicated and the power factor of the whole lighting apparatus is reduced due to the bleeding current.

SUMMARY OF THE INVENTION

It is an object of the present invention to provide a driver device and a corresponding driving method for driving a load, in particular an LED unit comprising one or more LEDs, providing compatibility to different dimmer devices, in particular to phase-cut dimmers, with low technical effort. Further, it is an object of the present invention to provide a corresponding light apparatus.

According to one aspect of the present invention, a driver device is provided comprising:

input terminals for receiving an input voltage from an external power source for powering the load, connection means for connecting the input terminals to each other and for providing a current path dependent on the polarity of the input voltage, wherein the connection means comprise a first current path for connecting the input terminals in a first current direction and a second current path for connecting the input terminals in a second current direction opposite to the first current direction, wherein the first and the second current path each comprise a current control unit for controlling a bleeding current in the respective current path and wherein the first and the second current path each comprise decoupling means for blocking the bleeding current in the respective current path in a reverse direction opposite to the respective current direction.

According to another aspect of the present invention, a driving method for driving a load, in particular an LED unit comprising one or more LEDs, is provided, wherein the driving method comprises the steps of:

receiving an input voltage from an external power supply at input terminals, connecting the input terminals to each other by means of connection means, providing a current path for a bleeding current in a forward direction from a first of the input terminals to a second of the input terminals or from the second to the first input terminal dependent on the polarity of the input voltage, and blocking the bleeding current in a reverse direction of the current path opposite to the forward direction.

According to still another aspect of the present invention, a light apparatus is provided comprising a light assembly comprising one or more light units, in particular an LED unit comprising one or more LEDs, and a driver device for driving said light assembly as provided according to the present invention.

Preferred embodiments of the invention are defined in the dependent claims. It shall be understood that the claimed method has similar and/or identical preferred embodiments as the claimed device and as defined in the dependent claims.

The present invention is based on the idea to provide a driver device having a high impedance and a low impedance path, wherein switching from the high impedance path to the low impedance path is synchronized with the cycle of the attached power supply, in particular mains voltage. The low impedance path is provided after zero crossing of the mains voltage. The zero crossing is not detected actively, but the low impedance path is prepared during one half cycle of the mains voltage and activated at the zero crossing due to the polarity reversal of the voltage automatically. The respective low impedance path is activated by means of the current control unit and the decoupling means block the path during the first half cycle and activate the respective path automatically after the polarity reversal at the zero crossing. Hence, no detection of the zero crossing is required and there is no voltage measurement required during the high impedance mode of the driver device. Thus, the driver device according to the present invention is compatible with different dimmer devices, in particular phase-cut dimmers, and can be provided with low technical effort. Preferably, the current control units comprise a control switch, in particular a transistor like a bipolar or a MOS transistor to control the current in the respective current path.

In a preferred embodiment, a control unit is provided for controlling the current control units. This is a simple solution to activate and deactivate the respective path at certain points in time or based on certain events.

In a further embodiment, at least one of the input terminals is connected to a voltage converter unit which is connected to the external power source, wherein the voltage converter is a phase-cutting device provided for cutting a phase of the input voltage and for providing a phase-cut AC voltage to the driver device. This embodiment provides a high power factor and low power loss due to the phase cutting of the mains voltage.

In a preferred embodiment, the decoupling means comprise a diode in the current path for blocking the bleeding current in the reverse direction and for passing the bleeding current in the forward direction. This provides a simple, cheap and effective device for decoupling the respective path in the reverse direction and providing a polarity-dependent current path.

In a preferred embodiment, the connection means comprise current limiting means for limiting the bleeding current. This provides a simple and effective solution to limit the bleeding current to avoid early wearout failures due to large bleeding currents.

In a further embodiment, the current measuring means are provided for measuring a load current provided to the load, and wherein the control unit is adapted to control the current control units on the basis of the measured load current. This provides an effective solution to detect a certain event or point in time to activate or deactivate the current control unit and to optimize the timing of the current control unit. In particular, the current control unit is activated when the load current is reduced to approximately zero. This optimizes the efficiency of the driving device and increases the power factor.

In an embodiment, current measurement means are provided for measuring the bleeding current, wherein the control unit is adapted to control the current control units on the basis of the measured bleeding current. This provides a simple solution to control the current control unit and to adjust the timing of the current control unit. In particular, the respective current path is deactivated when the bleeding current is increased or reaches a predefined level. Hence, the efficiency of the driver device and the power factor can be increased.

In an embodiment, the control unit is adapted to control the current control units on the basis of a phase angle of the input voltage detected by phase angle detection means. This provides a simple solution to deactivate the respective current path, when the phase of the input voltage is detected and the dimmer device provides the input voltage to the mains voltage and optimizes the timing of the current paths.

In an embodiment, the control unit is adapted to activate one of the control units during a first half cycle of the input voltage and to deactivate the current control unit when the phase angle is detected during a second half cycle of the input voltage. This provides an optimized solution to provide a low impedance current path when the dimmer device disconnects the input voltage from the mains voltage, e.g. between the zero crossing and the set firing angle, in the case of a leading edge dimmer. According to this embodiment, an optimized timing for providing a low impedance path can be achieved.

In this embodiment, the control unit is adapted to activate the current control units of the first and the second current path in an alternating manner depending on the polarity of the input voltage. This is a simple solution to provide polarity-dependent current paths for each of the respective half cycles of the input voltage with low technical effort.

According to a preferred embodiment, the control unit comprises at least one signal storage element to generate an activation and/or deactivation signal for the current control unit on the basis of the detected time that the load current reaches or exceeds a predefined level. In this case, the control unit needs to be synchronized initially, wherein any subsequent pulses are forwarded to the respective other switch. This provides a simple possibility to synchronize the whole driver device to the phase of the input voltage. Preferably, the signal storage element comprises a flip-flop unit. This provides a simple and robust possibility for synchronizing the driver device.

In a preferred embodiment, the control unit comprises at least one signal storage element to generate an activation and/or deactivation signal from the control unit on the basis of a detected time that the bleeder current reaches or exceeds a predefined level. This provides a further simple solution to synchronize the respective current path with the input voltage and to provide a high power factor of the driver device.

As mentioned above, the present invention provides a low impedance current path dependent on the polarity of the input voltage by simple technical means and provides a solution to provide a driver device which is compatible with a phase-cut dimmer for a retrofit LED lamp. By switching the current control units of the respective path on and off in an alternating manner depending on the polarity of the input voltage, each path is prepared while the decoupling element, in particular the diode, still blocks the respective path and activates the path after zero crossing and the respective polarity change of the input voltage. Hence, a low impedance path can be provided, with low technical effort, during a period of time in one half cycle of the input voltage starting precisely with a zero crossing of the input voltage.

BRIEF DESCRIPTION OF THE DRAWINGS

These and other aspects of the invention will be apparent from and elucidated with reference to the embodiment(s) described hereinafter. In the following drawings, FIG. 2a shows a schematic block diagram of a first embodiment of a polarity-dependent bleeder, FIG. 2b shows a schematic block diagram of a second embodiment of a polarity-dependent bleeder.

DETAILED DESCRIPTION OF THE INVENTION

Figure 1:
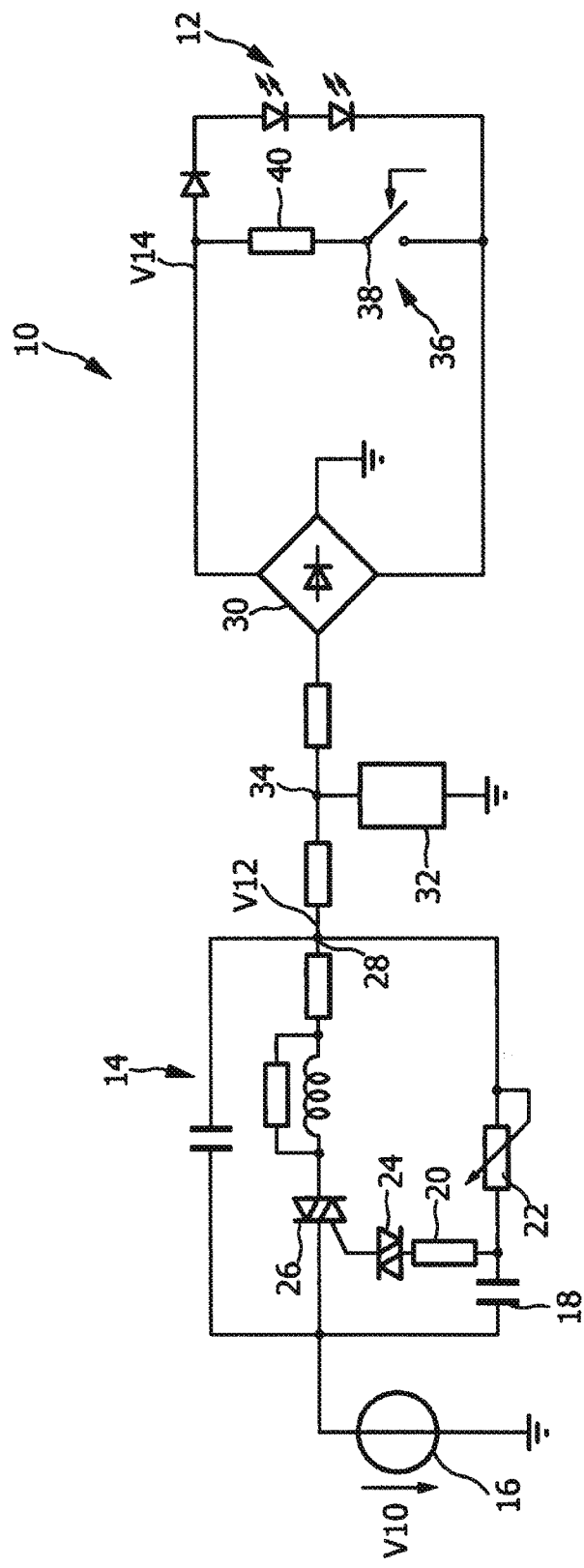
FIG. 1 shows a schematic block diagram of a known driver device for connecting an LED unit to a phase-cut dimmer including zero-crossing detection.

FIG. 1 shows an embodiment of a known driver device 10 for driving an LED unit 12 and for connecting the LED unit 12 via a dimmer device 14 to an external power supply 16 such as electric mains. The external power supply 16 provides an alternating voltage V10 (e.g. mains voltage) to the dimmer device 14. The dimmer device 14 is a phase-cut dimmer comprising a capacitor 18 and an adjustable resistor 22 for determining a point in time where the dimmer device 14 connects its output to the mains voltage V10. Resistor 22 can be adjusted to set the phase angle provided by the dimmer device 14. The RC circuit formed of the capacitor 18 and the resistors 20 is connected to a first switching device 24 such as a DIAC, which is connected to a second switching device 26 such as a TRIAC. The second switching device 26 is connected to the external power supply 16 and connects the voltage V10 to the output of the dimmer device 14. When the voltage across a capacitor 18 reaches a certain value, the first switching device 24 provides a current pulse to the second switching device 26 which connects the external power supply 16 with the output of the dimmer device and provides the voltage V10 to the driver device 10. Hence, the dimmer device 14 cuts the phase of the voltage V10 and provides a phase-cut voltage at its output terminal 28, which serves as an input voltage V12 for the driver device 10.

The driver device 10 comprises a rectifier unit 30 for rectifying the input voltage V12 to a unit polar voltage V14. The driver device 10 further comprises a voltage measurement unit 32 connected to an input terminal 34 of the driver device 10 for detecting a zero crossing of the input voltage V12. The driver device 10 further comprises a bleeder device 36 including a controllable switch 38 and a resistor 40. The bleeder device 36 provides a current path for the rectifier unit 30 by switching the controllable switch 38, wherein the bleeder device 36 is activated by means of the voltage measurement unit 32, which controls the controllable switch 38 via a control signal. Hence, the bleeder device 36 can be activated or deactivated for certain periods of time by means of the voltage measurement unit 32.

Consequently, the driver device 10 detects the zero crossing of the input voltage V12 and activates the bleeder device 36 by means of the controllable switch 38 to provide a bleeding current and a continuous current path to the dimmer device 14.

Generally, the driver device 10 matches with the dimmer device 14 by providing a partially time-continuous current path through the driver device 10 to the dimmer device 14, however, the zero crossing of the voltage V12 has to be measured by means of the voltage measurement unit 32, which limits the realizable impedance in the high impedance state. Particularly, if a plurality of LED units are connected to the driver device 10 as the load 12, each of the voltage measurement units 32 in each LED loads the dimmer and hence reduces the impedance in an unwanted way. To compensate for this, each voltage measurement unit 32 has to be provided with a very large input impedance. Hence, this known driver device 10 is technically complex and expensive to produce in a retrofit LED lamp.

FIG. 2a shows a schematic block diagram of a first embodiment of the present invention. Identical elements are denoted by identical reference numerals, and only the differences with respect to the diagram shown in FIG. 1 are explained in detail.

A polarity-dependent bleeder unit 50a is connected to the output terminal 28 of the dimmer device 14, to a neutral potential 52 and to an input terminal 54 of the load 12. A load current I1 is provided from the dimmer device 14 via the polarity dependent bleeder 50a to the load 12. The polarity-dependent bleeder 50a provides a bleeding current I2 dependent on the polarity of the input voltage V12. The polarity-dependent bleeder 50a is connected to the output terminal 28, and to the input terminal 54 of the load 12 and provided with measuring means to measure the load current I1. The polarity-dependent bleeding current I2 is controlled by means of the polarity-dependent bleeder 50a on the basis of the measured load current I1. Hence, the bleeding current I2 can be provided dependent on the load current I1 and the polarity of the input voltage V12. Alternatively, the current in the neutral wire 52 from and to the load 12 may be fed through the polarity-dependent bleeder 50a, instead of or in addition to the current I1.

FIG. 2b shows a schematic block diagram of a second embodiment of the present invention. Identical elements are denoted by identical reference numerals, wherein here only the differences are described in detail. The output terminal 28 of the dimmer device 14 is connected to the input terminal 54 of the load 12. A polarity-dependent bleeder 50b is connected to the output terminal 28 of the dimmer device 14 and to neutral 52. Since the polarity-dependent bleeder 50b cannot measure the load current I1, a separate signal line 56 is provided from the load 12 to the polarity-dependent bleeder 50b to provide the necessary information about the load current I1 to provide or adjust the bleeding current I2 in the embodiment where this is dependent on the load current I1. Detection of polarity may be in the polarity-dependent bleeder 50b, or shared with the load 12 and communicated with signal 56 or further signals in either direction, from the polarity-dependent bleeder 50b to the load 12 or from the load 12 to the polarity-dependent bleeder 50b.

Therefore, the polarity-dependent bleeder 50b provides the bleeding current I2 dependent on the polarity of the input voltage V12 and the information provided about a load current I1.

Hence, different possibilities are provided by the present invention to provide the polarity-dependent bleeding current I2 on the basis of the load current I1 and on the basis of the polarity of input voltage V12.

Figure 3A:
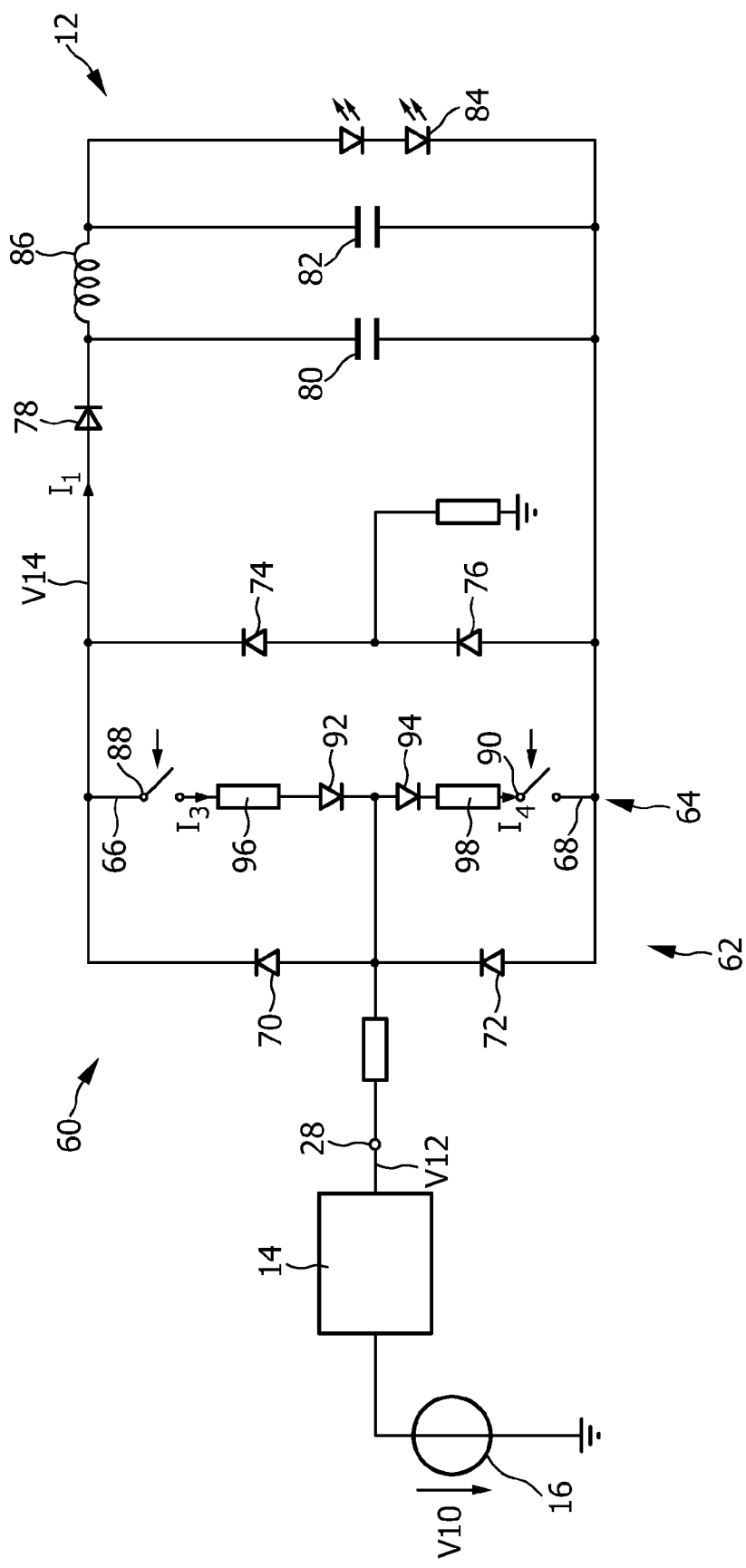
FIG. 3a shows a detailed schematic block diagram of a driver device including two polarity-dependent bleeder current paths.

FIG. 3a shows a detailed block diagram of a driver device 60 for powering the load 12. The driver device 60 comprises a rectifier unit 62 and a polarity-dependent bleeder 64 including a first current path 66 and a second current path 68.

The rectifier unit 62 comprises four diodes 70, 72, 74, 76 for rectifying the alternating input voltage V12 to the rectifier voltage V14 to power the load 12. This input rectification is found in many LED drivers. The polarity-dependent bleeder 64 is here quite closely combined with the load driving part, such that parts of the functionality, i.e. the rectification diodes 74 and 76, are used for both carrying the load current and carrying the bleeder current. Alternatively, the polarity-dependent bleeder 64 may be equipped with fully independent circuitry.

The load 12 comprises a diode 78, a first charge capacitor 80, a second charge capacitor 82 in parallel to an LED unit 84 and an inductive element 86 connecting the diode 78 to the LED unit 84.

The first current path 66 and the second current path 68 each comprise a controllable switch 88, 90, a diode 92, 94 and current limiting means, depicted as a resistor 96, 98. The first current path 66 is connected in parallel to the diode 70 of the rectifier unit 60. The diode 92 of the first current path 66 is connected in an opposite direction to the diode 70 of the rectifier unit 60.

The current path 68 is connected in parallel to the diode 72 of the rectifier unit 60. The diode 94 of the second current path 68 is connected in the opposite direction of the diode 72 of the rectifier unit 60.

The controllable switches 88, 90 of the current paths 66, 68 are controlled by a control unit (not shown).

The first and the second current path 66, 68 are switched on and off via the controllable switches 88, 90 on the basis of the load current I1 and other input signals, as will be explained later. The load current I1 is measured e.g. by measuring a voltage across the diode 78. When the load current I1 is reduced to a predefined level preferably close to zero after charging the capacitors 80, 82 and the polarity of the input voltage V12 is positive, the controllable switch 88 of the first current path 66 is closed. In this state, the diode 92 blocks a bleeding current during this half cycle of the input voltage V12. After the zero crossing of the voltage V10, the input voltage V12 will change its polarity and the diode 92 becomes conductive and a first bleeder current I3 is provided. Hence, the first current path 66 carries a timing circuit current I3, which allows proper operation of the dimmer device 14. The first bleeding current I3 is directed in an opposite direction with respect to the diode 70 and in an opposite direction with respect to the load current I1.

At a point in time during the second half cycle of the voltage V10, the dimmer device 14 applies the voltage V10 to the driver device 60. This input voltage V12 results in a charging current through the diodes 72 and 74 having an opposite polarity. At this time, the controllable switch 88 is turned off and the first current path 66 is deactivated. After the load current I1 is reduced to the predefined level, e.g. close to zero, the controllable switch 90 of the second current path 68 is closed. During this second half cycle of the input voltage V12, no bleeding current will flow through this second current path 68. After the zero crossing of the input voltage V12, the input voltage will change its polarity and the diode 94 becomes conductive. Hence, a second bleeding current I4 is provided in opposite direction to the load current I1 and carries the time circuit current I4 to allow proper operation of the dimmer device 14.

In other words, the polarity-dependent bleeder 64 is split into two paths 66, 68, one for each polarity of the input voltage V12. At a given polarity and at a certain point in time when the load current I1 is reduced, one of the current paths 66, 68 is prepared for the opposite polarity of the next half cycle. At this time the respective first bleeding current I3, I4 is blocked by the respective diode 92, 94. After the zero crossing of the input voltage V12, the respective path 66, 68 is automatically activated due to the changed polarity and the respective diode 92, 94. When the dimmer device 14 provides the mains voltage V10 to the driver device 60, the activated current path 66, 68 is deactivated by turning off the respective controllable switch 88, 90. After the load current I1 is reduced to the predefined level, the respective other current path 66, 68 is prepared by closing the respective controllable switch 88, 90.

The diodes 92, 94 may be formed of pn-diodes, high voltage diode stacks, high voltage psn-diodes, silicon carbide diodes or a body diode of a MOSFET, and are preferably chosen in dependence on the desired impedance and in dependence on the application and the expected operation temperature.

Figure 3B:
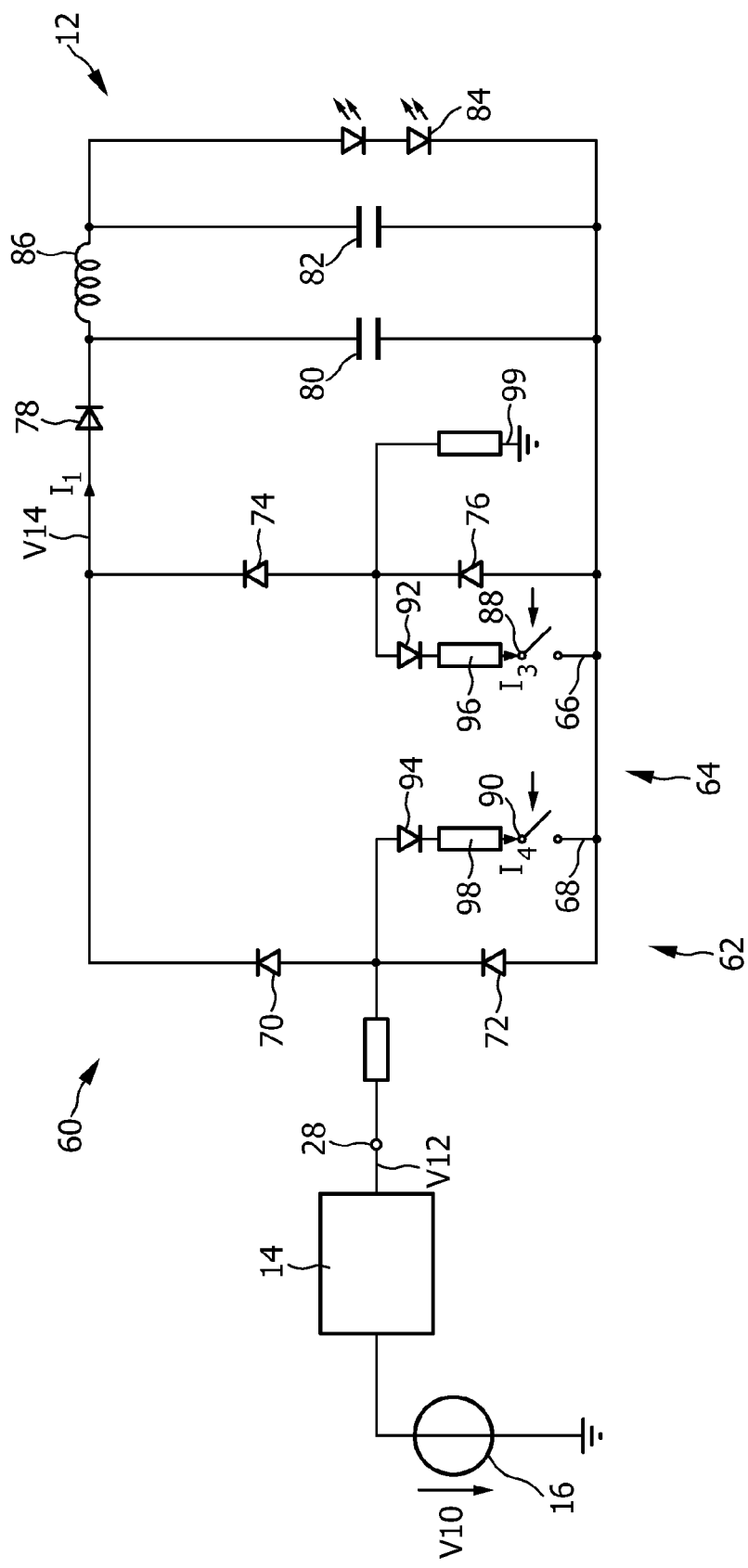
FIG. 3b shows a detailed schematic block diagram of an alternative embodiment of FIG. 3a, FIG. 4 shows a detailed schematic block diagram of an embodiment of the driver device according to FIG. 3a, FIG. 5 shows a detailed schematic block diagram of the driver device according to FIG. 3 including current sensing circuitries.

FIG. 3b is an alternative embodiment of the polarity-dependent bleeder 64, wherein identical elements are denoted by identical reference numerals, and here only the differences are explained. In this embodiment, both current paths 66, 68 are related to the same potential of the load voltage. To achieve this, the current path 66 is now connected to the other input terminal 99. The benefit of this embodiment is that the switches 88, 90 and measurement signals are related to the same reference potential, namely the negative supply rail.

Figure 4:
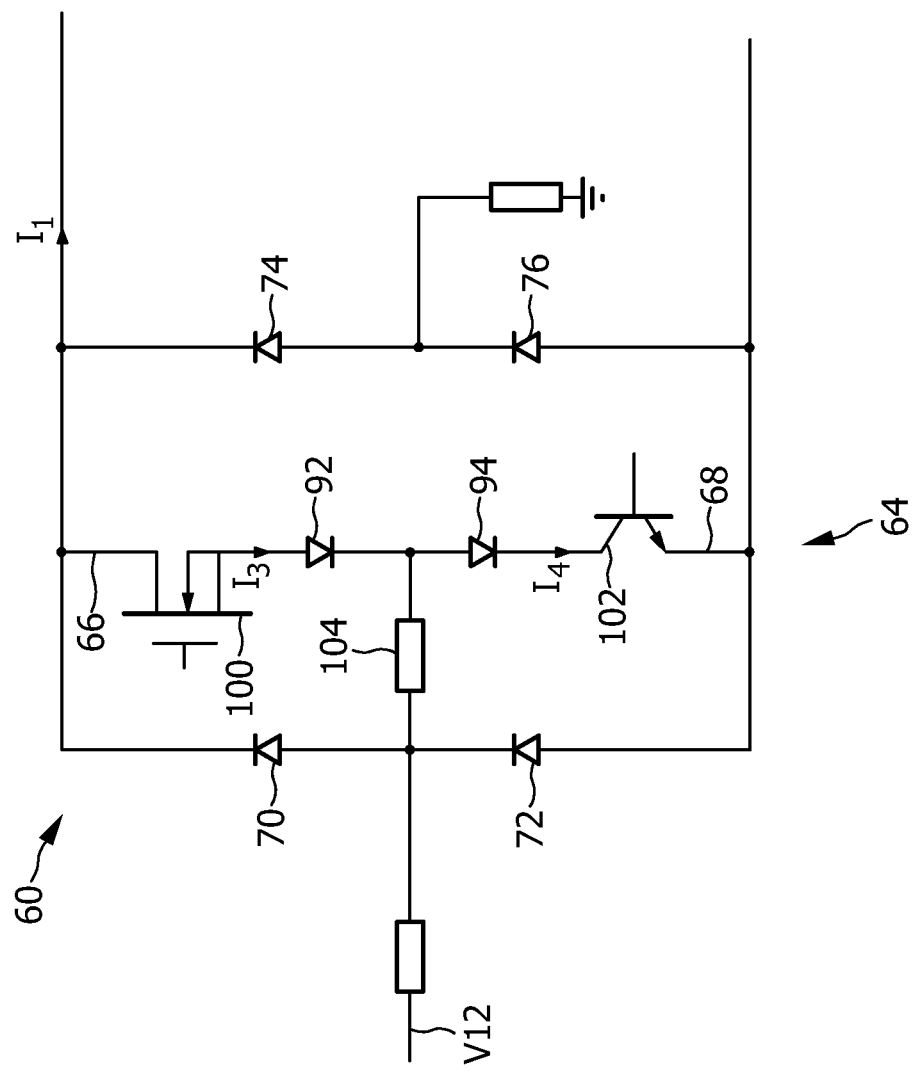

FIG. 4 shows a detailed block diagram of an embodiment of the polarity-dependent bleeder 64 shown in FIG. 3. Identical elements are denoted by identical reference numerals, wherein here just the differences are explained in detail.

The first current path 66 comprises a p-type MOS transistor 100 and the diode 92. The second current path 68 comprises an NPN bipolar transistor 102 and the diode 94. The first current path 66 and the second current path 68 are connected to each other and are jointly connected to a resistor 104 connected to an input of the driver device 60. It should be understood that also other semiconductor switches may be used for the two current paths 66, 68. The first and the second current paths 66, 68 both use the resistor 104 as a current limiting element. Hence, the technical effort and the costs are reduced. Since the first current path 66 and the second current path 68 are directly connected to each other, the switching of the switches 100, 102 has to be synchronized and an overlap of the conducting period of the switches 100, 102 should be avoided. In other words, a short circuit should be avoided.

Figure 5:
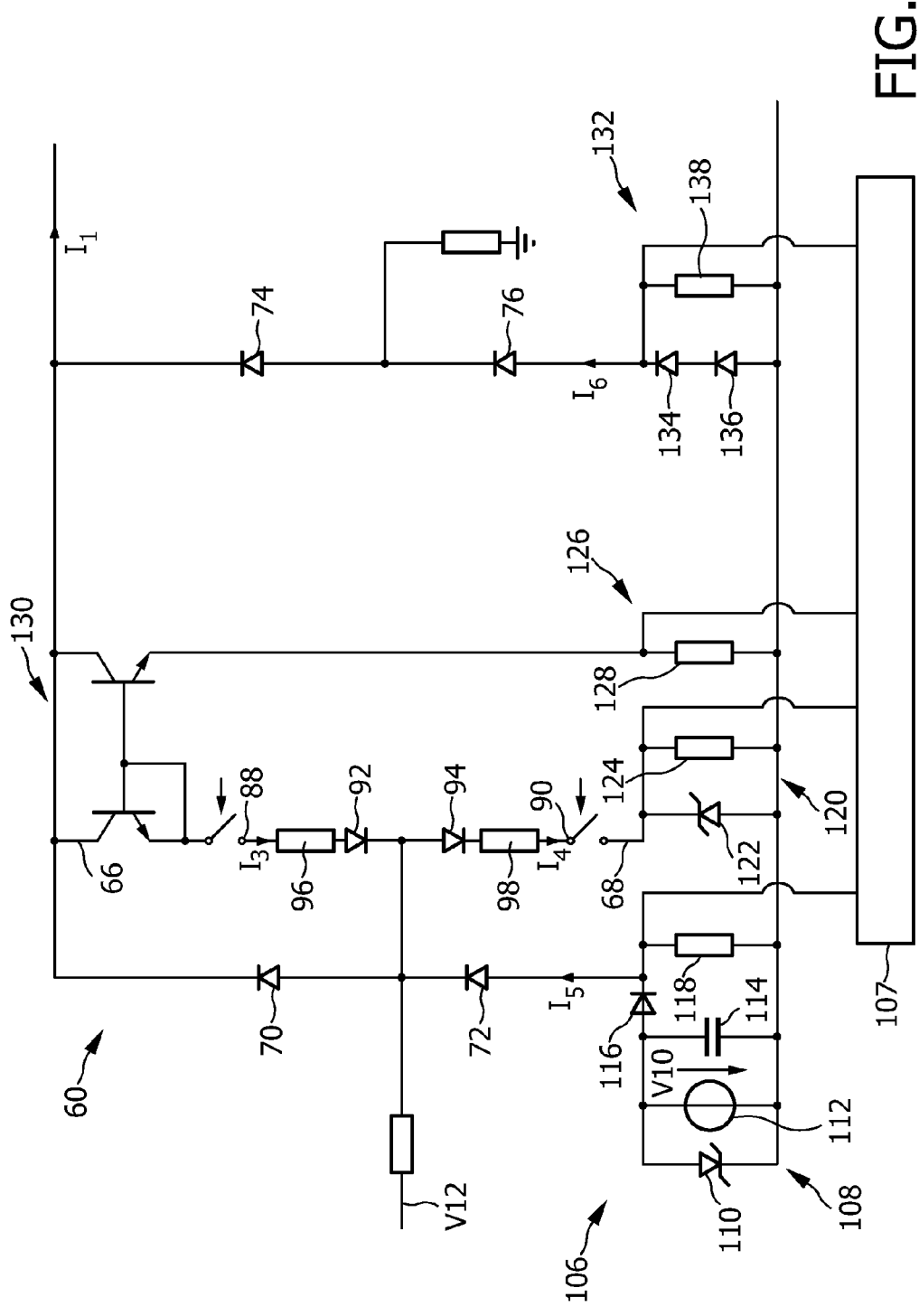

FIG. 5 shows a detailed block diagram of the driver device 60 including current measurement means 106 for measuring currents in the driver device 60 and for timing the controllable switch 88, 90. Identical elements are denoted by identical reference numerals, and here just the differences are explained in detail. The current measurement means 106 is connected to a control unit 107 to process the measured currents and to calculate the timing of the controllable switches 88, 90.

The current measurement means 106 comprises a first current measurement unit 108 for measuring a load current I5 in the diode 72, which is the load current during the negative half cycle of the input voltage V12. The first current measurement unit 108 comprises a Zener diode 110, an auxiliary voltage source 112, a capacitor 114, a diode 116 and a resistor 118. The current I5 is measured by measuring the voltage drop across the resistor 118. The voltage drop in resistor 118 can be limited to a voltage V16 provided by the auxiliary voltage source 112 plus the voltage drop in the diode 116. Effectively, a small amplitude current I5 will flow through the resistor 118, while the voltage V16 is decoupled via diode 116. When the current I5 is high enough to cause a high voltage drop in resistor 118, part of the current will flow via diode 116 and charge the capacitor 114, and support the voltage source 112, wherein V16 may be clamped by the Zener diode 110. In total, this structure may be used as a combination of current measurement (at low current levels) and auxiliary supply (at high current levels). With a proper design, i.e. of the current consumed from the voltage V16 being quite low, no extra source 112 is required. V16 may be used to power the control unit 107 and further control units in the system.

The first current measurement unit 108 is connected to the control unit 107 to process the value of the load current I5.

The current measurement means 106 further comprises a current measurement unit 120 for measuring the bleeding current I4 of the second current path 68. The current measurement unit 120 comprises a Zener diode 122 and a resistor 124 and measures the voltage drop across the resistor 124 to measure the bleeding current I4. The current measurement unit 120 is connected to the control unit 107 to process the measured bleeding current I4. A high resistor value may be selected for resistor 124, assuring high sensitivity to low current levels. Voltage drop across resistor 124 is limited by the Zener diode 122.

The current measurement means 106 further comprises a current measurement unit 126, which comprises a resistor 128 and which is connected to a current mirror 130 connected to the first current path 66 to measure the bleeding current I3 in the first current path 66. The current mirror 130 provides a current identical with or corresponding to the bleeding current I3 to the resistor 128. The current measurement unit 126 measures the voltage drop across the resistor 128. The current measurement unit 126 is connected to the control unit 107 to process the value of the bleeding current I3.

The current measurement means 106 further comprises a current measurement unit 132 for measuring a load current I6 in the diode 76 of the rectifier unit 62. The load current I6 is the load current during the positive half cycle of the input voltage V12. The current measurement unit 132 comprises two diodes 134, 136 and a resistor 138. The current measurement unit 132 measures the voltage drop across the resistor 138. Again, at high currents, voltage drop and hence losses are limited by the diodes 134, 136. The current control unit 132 is connected to the control unit 107 for processing the value of the load current I6.

FIG. 5 shows different sensing circuits to measure the current, flowing in the circuit, both in the polarity-dependent bleeder paths 66, 68 as well as in the load path. Except for the measurement of I3, the other currents are measured in a non-linear way, i.e. there is a region where the readout signal (i.e. voltage drop) does not increase proportionally with the measured current. For the purpose here, this results in high sensitivity at low current levels while limiting the losses at high current.

The control unit 107 is preferably formed of a microcontroller and measures the mains frequency and calculates the time between a rise or start of the bleeding currents I3, I4 and the start or variation of the load current I5, I6 and reassembles the phase angle of the input voltage V12. The control unit 107 calculates the current consumption and also derives control information for the LED driver. Alternatively, the control unit 107 may be formed without a microcontroller.

Figure 6:
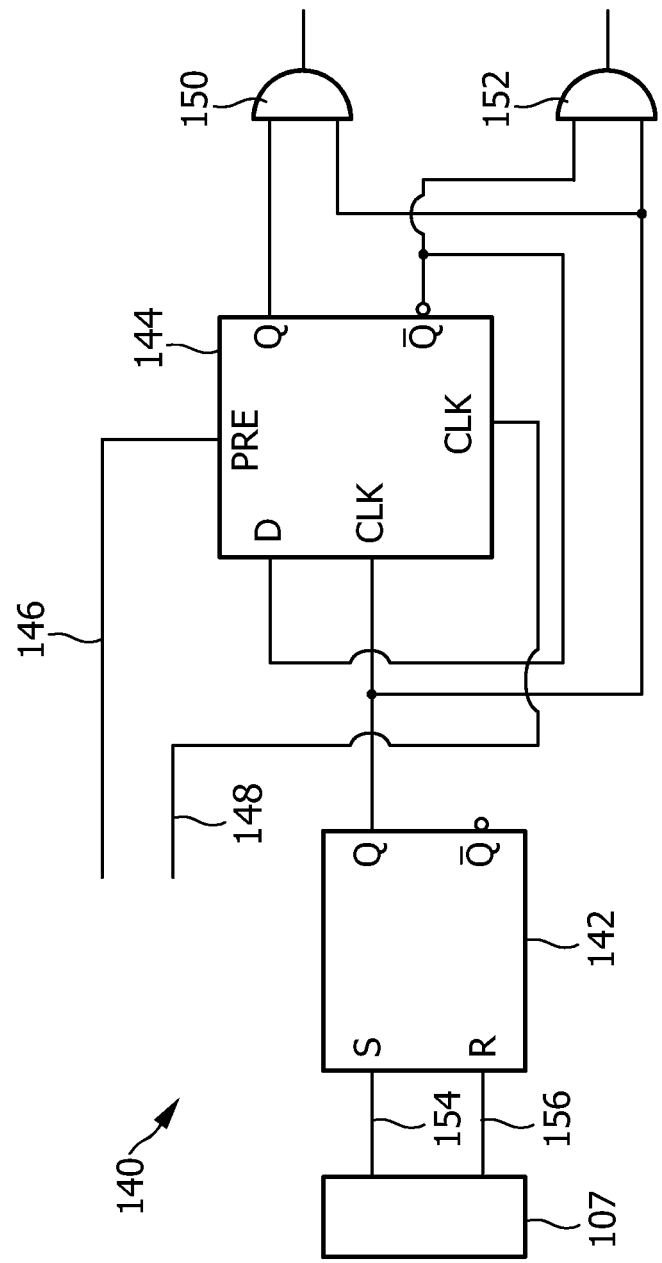
FIG. 6 shows a schematic block diagram of a control unit to control the polarity-dependent bleeder device.

FIG. 6 shows a detailed block diagram of a control unit 140 for controlling the controllable switches 88, 90. The control unit 140 comprises two flip flops 142, 144. The first flip flop 142 is provided for storing the polarity information of the input voltage V12 and the second flip flop 144 is provided for turning the control switches 88, 90 on and off.

The first flip flop 142 is connected to the control unit 107 and provided with a signal indicating the beginning and the end of the load current I1. The second flip flop 144 is connected to the output of the first flip flop 142 and receives signals for polarity synchronization via synchronization lines 146, 148. The output of the first flip flop 142 and the output of the second flip flop 144 are connected to a first AND gate 150 and a second AND gate 152. The first AND gate 150 and the second AND gate 152 are provided for switching the control switches 88, 90.

The first flip flop 142 deactivates the switches 88, 90 when the load current I1 is provided and the dimmer device 14 provides the mains voltage V10 to the input of the driver device 60. The first flip flop 142 is connected to the control unit 107 and receives a signal indicating the end of the load current I1 via a first input line 154 and a second signal indicating the beginning of the load current I1 via a second input line 156.

The second flip flop 144 activates one of the control switches 88, 90 at a predefined point in time. Driver devices for driving the control switches 88, 90 may be connected to the AND gates 150, 152 (not shown). In a simple case, this control unit 140 is initially synchronized with the polarity of the input voltage V12 and any following pulses are provided to the respective other control switch 88, 90. To avoid disturbance of the synchronization, a continuous synchronization of the polarity via the input lines 154, 156 is preferred.

Figure 7:
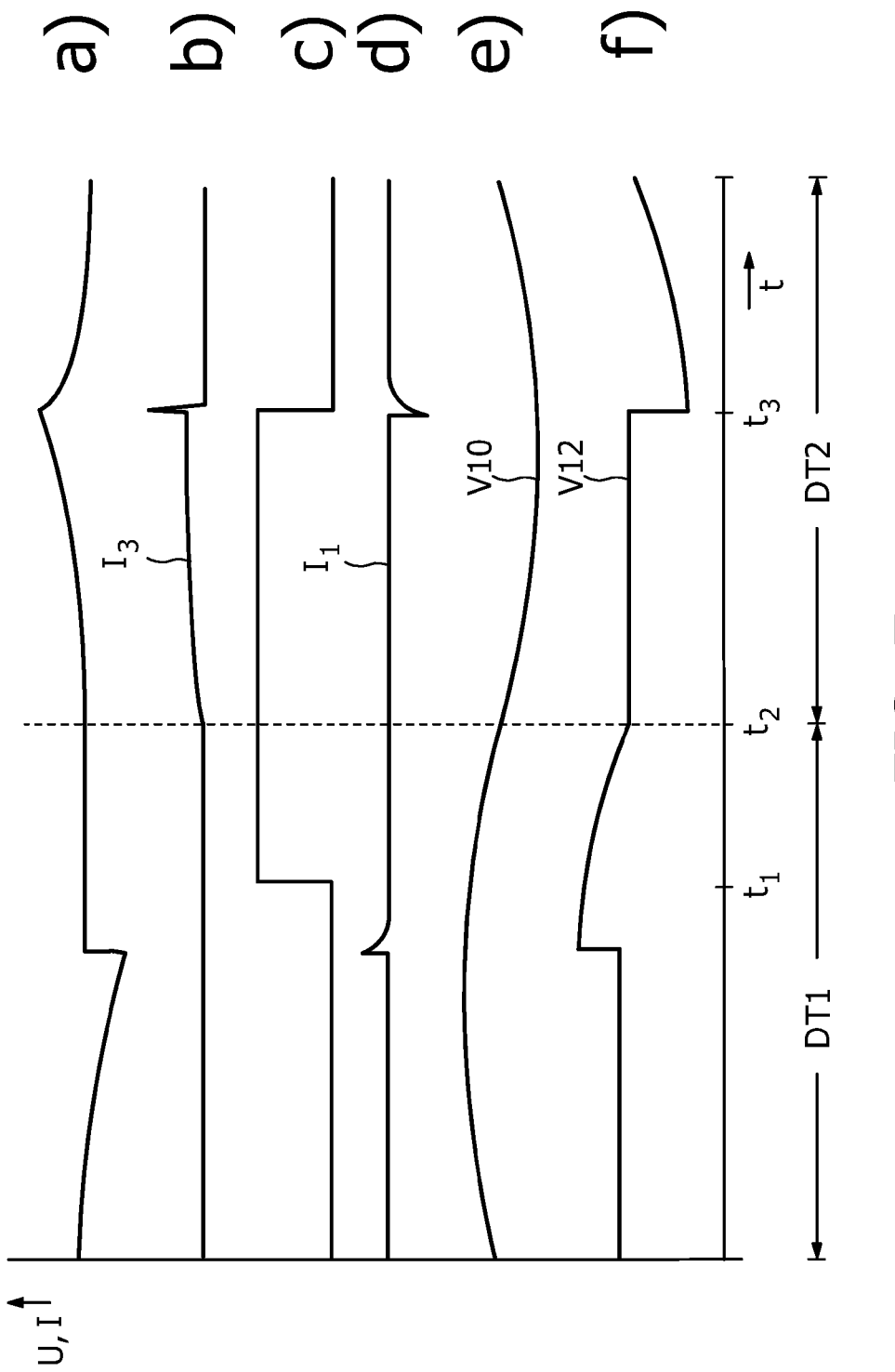
FIG. 7 shows a diagram illustrating waveforms of currents and voltages of the driver devices shown in FIGS. 3a and 3b.

In FIG. 7, a diagram is provided showing a) the voltage across the capacitor 18, b) the bleeding current I3, c) the control signal for controlling the controllable switch 88, d) the load current I1, e) the mains voltage V10 and f) the input voltage V12. In FIG. 7, a first half cycle ΔT1 and a second half cycle ΔT2 is shown.

The controllable switch 88 is closed at t1 during the first half cycle ΔT1 when the load current I1 is reduced to zero as shown in FIG. 7c. Due to the blocking diode 92 the bleeding current I3 remains zero until the zero crossing of the mains voltage is reached at t2 and the second half cycle ΔT2 starts. At t3, the dimmer device 14 provides the mains voltage V10 to the driver device 60 and the input voltage V12 rises. At this point the controllable switch 88 is switched off as shown in FIG. 7c and the bleeding current I3 is reduced to zero as shown in FIG. 7b. Hence, at t2 the high impedance path of the driver device 60 is replaced by the low impedance path 66. In the time frame from t2 to t3 the low impedance path 66 is provided and the timing circuit of the dimmer device 14 can operate as designed. Hence, the driver device 60 is compatible with any dimmer device for a retrofit LED unit.

Figure 8:
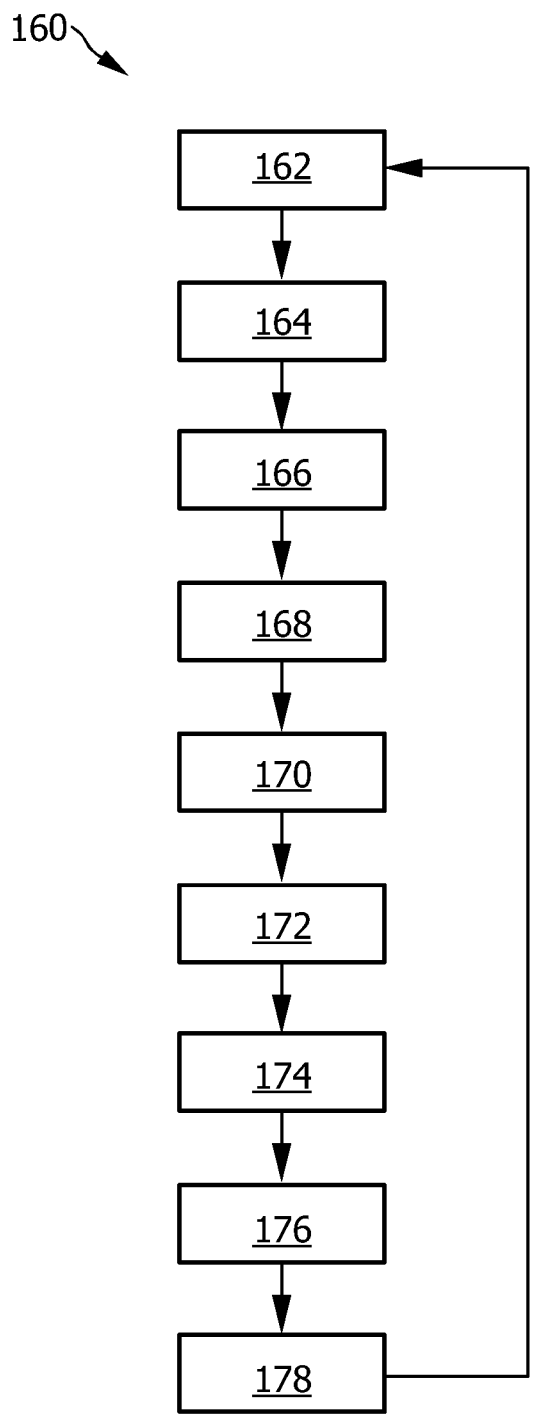
FIG. 8 shows a flow diagram illustrating the steps of the present invention

In FIG. 8, a flow diagram 160 is provided showing the steps of the present invention.

First, the load current I1 is measured and the control switch 90 of current path 68 is closed when the load current is decreased to a predefined level as shown by step 162. Then, the bleeding current I4 is measured and the point in time that the bleeding current I4 starts is detected as shown at step 164. The load current I1 is measured at step 166 and the control switch 90 is opened when the phase angle of the input voltage V12 is detected as shown by step 168. When the load current I1 is decreased to a predefined level as shown by step 170, the control switch 88 of the current path 66 is closed at step 172. Then, the bleeding current I3 is measured and the point in time that the bleeding current I3 starts is detected as shown at step 174. At step 176, the start of the load current I1 is detected and at step 178 the control switch 88 is deactivated to stop the bleeding current I3. After step 178, the flow starts again with measuring the input current I1 at step 162 and with preparing the current path 68 by closing the control switch 90.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. Driver device for driving a load, in particular an LED unit having one or more LEDs, comprising:
   input terminals for receiving an input voltage from an external power source for powering the load,
   a rectifier for rectifying the input voltage, and
   a polarity-dependent unit for connecting the input terminals to each other and for providing a current path dependent on the polarity of the input voltage, wherein the polarity-dependent unit comprises:

a first current path for connecting the input terminals in a first current direction and a second current path, at least partly different from the first current path, for connecting the input terminals in a second current direction opposite to the first current direction, wherein the first and the second current path each comprise a current control unit for controlling a bleeding current in the respective current path and wherein the first and the second current path each comprise a decoupling diode for blocking the bleeding current in the respective current path in a reverse direction opposite to the respective current direction.

2. Driver device as claimed in claim 1, wherein at least one of the input terminals is connected to a voltage converter unit which is connected to the external power source, wherein the voltage converter is a phase-cutting device provided for cutting a phase of the input voltage and for providing a phase-cut AC voltage to the driver device.

3. Driver device as claimed in claim 1, further comprising a control unit adapted to control the current control units.

4. Driver device as claimed in claim 1, wherein the polarity-dependent unit comprises one or more resistors.

5. Driver device as claimed in claim 3, further comprising a current measuring unit adapted to measure a load current provided to the load, and wherein the control unit is adapted to control the current control units on the basis of the measured load current.

6. Driver device as claimed in claim 3, further comprising a current measuring unit adapted to measure the bleeding current, and wherein the control unit is adapted to control the current control units on the basis of the measured bleeding current.

7. Driver device as claimed in claim 3, wherein the control unit is adapted to control the current control units on the basis of a phase angle of the input voltage.

8. Driver device as claimed in claim 7, wherein the control unit is adapted to activate one of the current control units during a first half cycle of the input voltage and to deactivate the current control unit when the phase-cut angle is detected during a second half cycle of the input voltage.

9. Driver device as claimed in claim 8, wherein the control unit is adapted to activate the current control units of the first and the second current path in an alternating manner depending on the polarity of the input voltage.

10. Driver device as claimed in claim 3, wherein the control unit comprises at least one signal storage element to generate an activation signal and/or a deactivation signal for the current control unit on the basis of a detected time that the load current reaches or exceeds a predefined level.

11. Driver device as claimed in claim 3, wherein the control unit comprises at least one signal storage element to generate an activation signal for the current control unit on the basis of a detected time that the bleeder current reaches or exceeds a predefined level.

12. Driver device as claimed in claim 1, wherein one or more of the diodes of the rectifier are applied to carry both load current and bleeder current.

13. Driver device as claimed in claim 10, wherein the control unit comprises at least one signal storage element to generate a deactivation signal for the current control unit on the basis of a detected time that the bleeder current reaches or exceeds a predefined level.

14. Driving method for driving a load, in particular an LED unit comprising one or more LEDs, the driving method comprising the steps of:
   receiving an input voltage from an external power supply at input terminals,
   rectifying the input voltage,
   connecting the input terminals to each other and providing a current path dependent on the polarity of the input voltage by a polarity-dependent unit,
   providing a first current path for connecting the input terminals in a first current direction,
   providing a second current path, at least partly different from the first current path, for connecting the input terminals in a second current direction opposite to the first current direction,
   controlling a bleeding current in each of the first and the second current path, and
   blocking the bleeding current in a reverse direction of the current path opposite to the forward direction by a decoupling diode.

15. A light apparatus comprising:
   a light assembly comprising one or more light units, in particular an LED unit comprising one or more LEDs, and
   a driver device for driving said light assembly as claimed in claim 1.

* * * * *